(12) United States Patent
Chang

(10) Patent No.: US 11,764,678 B2
(45) Date of Patent: Sep. 19, 2023

(54) CONSTANT ON TIME CONVERTER CONTROL CIRCUIT AND CONSTANT ON TIME CONVERTER

(71) Applicant: ELITE SEMICONDUCTOR MICROELECTRONICS TECHNOLOGY INC., Hsinchu (TW)

(72) Inventor: Yao-Ren Chang, Hsinchu (TW)

(73) Assignee: ELITE SEMICONDUCTOR MICROELECTRONICS TECHNOLOGY INC., Hsinchu (TW)

( * ) Notice: Subject to any disclaimer, the term of this patent is extended or adjusted under 35 U.S.C. 154(b) by 30 days.

(21) Appl. No.: 17/580,663

(22) Filed: Jan. 21, 2022

(65) Prior Publication Data

US 2023/0238886 A1 Jul. 27, 2023

(51) Int. Cl.
*H02M 3/158* (2006.01)
*H02M 1/00* (2006.01)

(52) U.S. Cl.
CPC ....... *H02M 3/1582* (2013.01); *H02M 1/0096* (2021.05); *H02M 1/0025* (2021.05)

(58) Field of Classification Search
CPC .... H02M 3/156; H02M 3/1563; H02M 3/157; H02M 3/158; H02M 3/1582; H02M 1/0025; H02M 1/0096
See application file for complete search history.

(56) References Cited

U.S. PATENT DOCUMENTS

| 9,647,552 | B2 * | 5/2017 | Li | H02M 3/158 |
| 2004/0207375 | A1 * | 10/2004 | Umemoto | H02M 3/156 |
| | | | | 323/282 |
| 2014/0300330 | A1 * | 10/2014 | Sugiyama | H02M 3/156 |
| | | | | 323/271 |

FOREIGN PATENT DOCUMENTS

CN 105406713 A 3/2016

\* cited by examiner

*Primary Examiner* — Nguyen Tran

(57) ABSTRACT

A constant on time converter control circuit and a constant on time converter are provided. The constant on time converter control circuit comprises an error amplifier, a voltage to current converter, and an initial current source. The error amplifier is for receiving a reference voltage signal and a feedback voltage signal and outputting a compensated voltage signal. The voltage to current converter receives the compensated voltage signal and outputs a converted current signal. The initial current source provides an initial current signal. The initial current signal and the converted current signal form a new reference voltage signal. A constant on time OFF time comparator receives the new reference voltage signal and the feedback voltage signal and outputs a control signal. The control signal affects the turning on and turning off of electronic switches to produce an output voltage of a constant on time converter.

15 Claims, 10 Drawing Sheets

400A

CONSTANT ON TIME CONVERTER CONTROL CIRCUIT AND CONSTANT ON TIME CONVERTER

BACKGROUND OF THE INVENTION

1. Field of the Invention

The present disclosure relates to constant on time converters, and in particular to a constant on time (COT) converter control circuit with effective control to facilitate improved line and load regulation.

2. Description of the Related Art

Switching mode power supplies often use switching converters that utilize constant on time (COT) circuits. However, it is difficult to stabilize the output voltage using the conventional constant on time (COT) control circuit.

A common disadvantage of the conventional constant on time (COT) control circuit is that transient response errors negatively impact the line and load regulation signals.

Therefore, to overcome the disadvantages of the prior art, there is need for an improved constant on time (COT) converter that can efficiently and effectively achieve line and load regulation.

BRIEF SUMMARY OF THE INVENTION

An objective of the present disclosure is to provide a constant on time (COT) converter control circuit with effective control in order to facilitate improved line and load regulation.

According to embodiments of the invention, a constant on time (COT) converter control circuit is provided, comprising an error amplifier, a voltage to current converter, and an initial current source.

The error amplifier is for receiving a reference voltage signal and a feedback voltage signal and outputting a compensated voltage signal. The voltage to current converter is for receiving the compensated voltage signal and outputting a converted current signal. The initial current source is for providing an initial current, the initial current and the converted current forming a new reference voltage signal.

In some embodiments of the COT converter control circuit, the constant on time converter control circuit further comprises a comparator for receiving the new reference voltage signal and the feedback voltage signal and outputting a control signal.

In some embodiments of the COT converter control circuit, the control signal affects turning on and turning off of electronic switches to produce an output voltage signal of a constant on time converter.

In some embodiments of the COT converter control circuit, the comparator comprises an OFF time comparator.

In some embodiments of the COT converter control circuit, the COT converter control circuit further comprises a sum resistor electrically connected to the initial current source.

In some embodiments of the COT converter control circuit, the COT converter control circuit further comprises a low pass filter electrically connected to an input of the error amplifier.

In some embodiments of the COT converter control circuit, the low pass filter comprises a filter resistor and a filter capacitor.

In some embodiments of the COT converter control circuit, the COT converter control circuit further comprises a compensation capacitor electrically connected to an output of the error amplifier.

In some embodiments of the COT converter control circuit, the constant on time converter control circuit comprises an error amplifier, a voltage to current converter, an initial current source, a constant on time OFF time comparator, a sum resistor, a low pass filter, a compensation capacitor. The error amplifier is for receiving a reference voltage signal and a feedback voltage signal and outputting a compensated voltage signal. The voltage to current converter is for receiving the compensated voltage signal and outputting a converted current signal. The initial current source is for providing an initial current signal, the initial current signal and the converted current signal forming a new reference voltage signal. The constant on time OFF time comparator is for receiving the new reference voltage signal and the feedback voltage signal and outputting a control signal, wherein the control signal affects turning on and turning off of electronic switches to produce an output voltage signal of a constant on time converter. The sum resistor is electrically connected to the initial current source. The low pass filter is electrically connected to an input of the error amplifier. The compensation capacitor is electrically connected to an output of the error amplifier.

According to embodiments of the invention, a constant on time converter is provided, comprising: a constant on time converter circuit and a constant on time converter control circuit. The constant on time converter circuit includes a comparator for receiving a new reference voltage signal and a feedback voltage signal and outputting a control signal, wherein the feedback voltage signal is internally from the constant on time converter circuit. The constant on time converter control circuit includes an error amplifier, a voltage to current converter, and an initial current source. The error amplifier is for receiving a reference voltage signal and the feedback voltage signal and outputting a compensated voltage signal. The voltage to current converter is for receiving the compensated voltage signal and outputting a converted current signal. The initial current source is for providing an initial current signal, the initial current signal and the converted current signal forming the new reference voltage signal.

In an embodiment of the present invention, the initial current source provides the initial current signal whose value is according to a value of the reference voltage signal multiplied by a variable and divided by a value of the sum resistor, wherein the variable is a positive value less than 1.

In an embodiment of the present invention, the variable is greater than 0.5.

DETAILED DESCRIPTION OF THE INVENTION

To facilitate understanding of the object, characteristics and effects of this present disclosure, embodiments together with the attached drawings for the detailed description of the present disclosure are provided.

Figure 1:
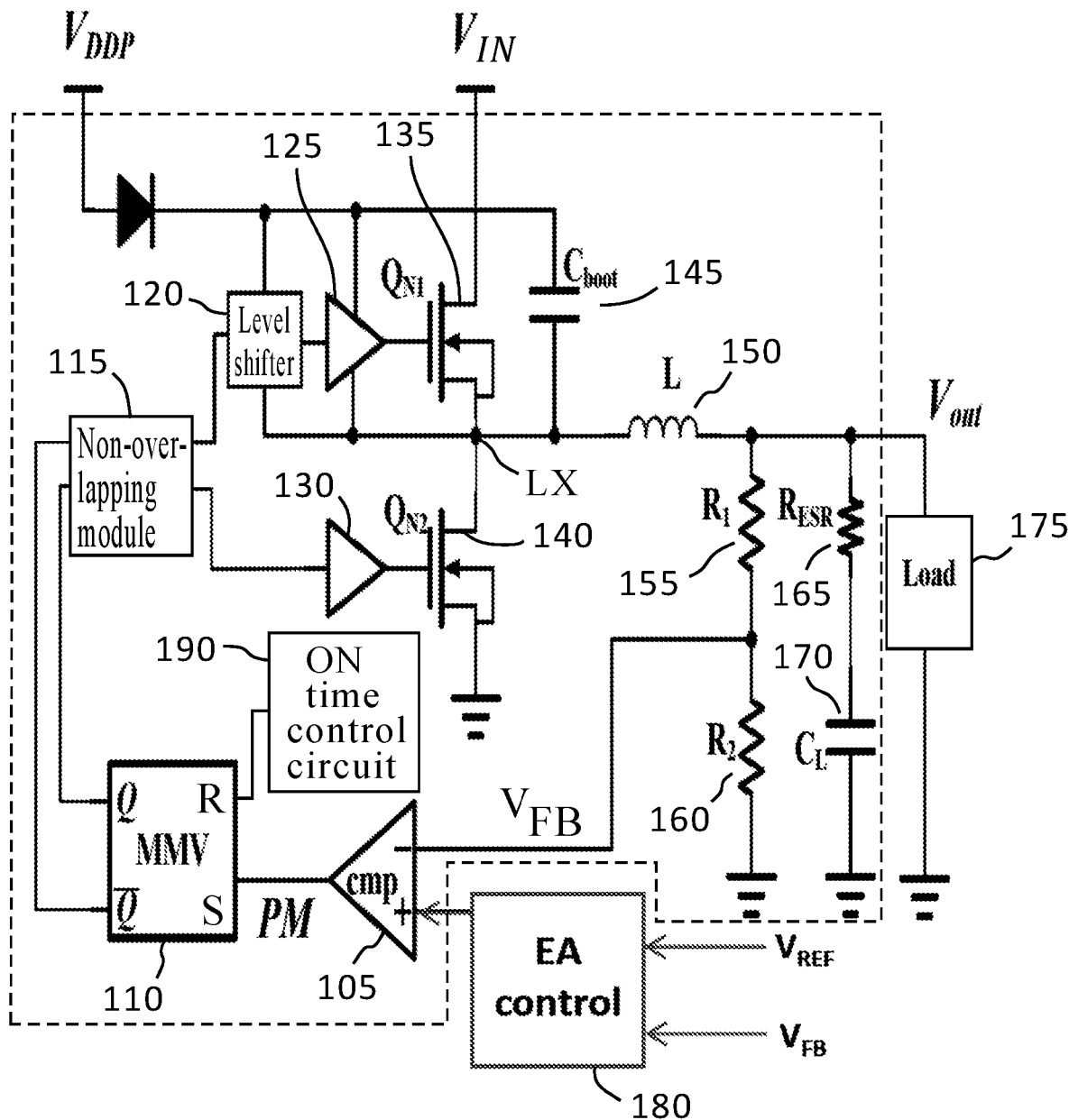
FIG. 1 is a drawing illustrating a constant on-time (COT) converter with control circuit according to an embodiment of the present invention.

Refer to FIG. 1, which is a drawing illustrating a constant on-time (COT) converter with control circuit (100) according to an embodiment of the present invention.

As shown in FIG. 1, the constant on-time (COT) converter 100 comprises a COT converter circuit (as indicated by dashed line) and a COT converter control circuit (such as including the error amplifier controller 180), for providing an output voltage signal $V_{out}$ to a load (Load) 175. The COT converter control circuit serves as a control circuit for providing a new reference signal according to a feedback voltage signal $V_{FB}$ and a reference voltage signal $V_{REF}$, wherein the feedback voltage signal $V_{FB}$ is provided internally from the COT converter circuit. For example, the COT converter circuit comprises a comparator 105, a monostable multivibrator (MMV) 110, a non-overlapping module 115, a level shifter 120, a plurality of electronic switches (e.g., 135, 140), and an output stage. The COT converter control circuit includes an error amplifier controller (e.g., indicated as "EA control") 180.

The electronic switches 135, 140 in an embodiment comprise N-channel metal-oxide-semiconductor field-effect transistors (MOSFET). In other embodiments other types of transistors, MOSFETs, or other electronic switches are utilized.

Following are details describing the structure and architecture of the constant on-time (COT) converter 100 of an embodiment of the present invention illustrated in FIG. 1.

As shown in FIG. 1, the drain of the first electronic switch ($Q_{N1}$) 135 is electrically coupled to an input voltage $V_{IN}$. The source of the second electronic switch ($Q_{N2}$) 140 is connected to ground. The source of the first electronic switch 135 is connected to the drain of the second electronic switch 140.

The output stage comprises an inductor (L) 150, a first resistor ($R_1$) 155, a second resistor ($R_2$) 160, a third resistor ($R_{ESR}$) 165, and a load capacitor ($C_L$) 170. A first end of the inductor 150 is connected to the node created between the first electronic switch 135 and the second electronic switch 140. The second end of the inductor 150 is connected to a first end of the first resistor 155 and the first end of the third resistor 165, and provides the output voltage signal $V_{out}$ to the load (Load) 175. The second end of the first resistor 155 is connected to a first end of the second resistor 160. The second end of the second resistor 160 is connected to ground. The second end of the third resistor 165 is connected to a first end of the load capacitor 170. The second end of the load capacitor 170 is connected to ground.

The node created at the connection between the first resistor 155 and the second resistor 160 is electrically connected to a negative input of the comparator (cmp) 105 and provides a feedback voltage signal $V_{FB}$ to the comparator 105.

This feedback voltage signal $V_{FB}$ is also provided to a second input of the error amplifier controller (EA control) 180. A reference voltage signal $V_{REF}$ is provided to the first input of the error amplifier controller 180. The output of the error amplifier controller 180 is electrically connected to the positive input of the comparator 105.

The output of the comparator 105 is electrically connected to an input of the monostable multivibrator (MMV) 110 and provides a pulse width modulation signal (PM) to the mono stable multivibrator 110.

The monostable multivibrator 110, for example, can be an S-R flip flop, comprising two inputs R and S, for example. The output of the comparator 105 can be connected to the input S of the monostable multivibrator 110. An ON time control circuit 190 can be connected to the input R of the monostable multivibrator 110. The monostable multivibrator 110 comprises two outputs Q and $\overline{Q}$, which is the complement of Q. Both of these outputs Q and $\overline{Q}$ are electrically connected to two inputs of the non-overlapping module 115.

A first output of the non-overlapping module 115 is connected to the input of the level shifter 120. A second output of the non-overlapping module 115 is connected to an input of a second buffer 130. The output of the second buffer 130 is electrically connected to the gate of the second electronic switch 140.

An input voltage signal VDDP is connected to the anode of a diode and the cathode of the diode is connected to a first terminal of the level shifter 120. A second terminal of the level shifter 120 is connected to the first end of the inductor (L) 150. The output of the level shifter 120 is electrically connected to the input of a first buffer 125. A first terminal of the first buffer 125 is electrically connected to the first terminal of the level shifter 125 and the cathode of the diode. A second terminal of the first buffer 125 is electrically connected to the first end of the inductor 150 and the second terminal of the level shifter 120. The output of the first buffer 125 is electrically connected to the gate of the first electronic switch 135.

A capacitor ($C_{boot}$) 145 is connected between the cathode of the diode and the first end of the inductor 150.

The electronic switches 135, 140 are controlled to convert the input voltage $V_{IN}$ into the output voltage signal $V_{out}$ by turning the first electronic switch 135 and the second electronic switch 140 on and off.

The first electronic switch 135 is controlled to turn on and to turn off by the output signal of the level shifter 120 via the first buffer 125. The second electronic switch 140 is controlled to turn on and to turn off by the output signal output by the second output of the non-overlapping module 115 via the second buffer 130.

The output voltage signal $V_{out}$ is converted to the feedback voltage signal $V_{FB}$ that is provided to the negative input of the comparator 105 and the second input of the error amplifier controller 180. The error amplifier controller 180 utilizes the voltage level of the feedback voltage signal $V_{FB}$ and the voltage level of the reference voltage signal $V_{REF}$ and outputs the result to the positive input of the comparator 105. The comparator 105 compares the voltage level of the feedback voltage signal $V_{FB}$ and the voltage level of the output signal from the error amplifier controller 180 and outputs a pulse width modulation (PWM) signal to the monostable multivibrator 110.

The monostable multivibrator 110 utilizes the signal received from the comparator 105 and generates a signal and its complement and provides these two signals to the non-overlapping module 115.

As a result, the first output signal from the non-overlapping module 115 controls the level shifter 120 to turn the first electronic switch 135 on and off, and the second output signal from the non-overlapping module 115 turns the second electronic switch 140 on and off.

Figure 2A:
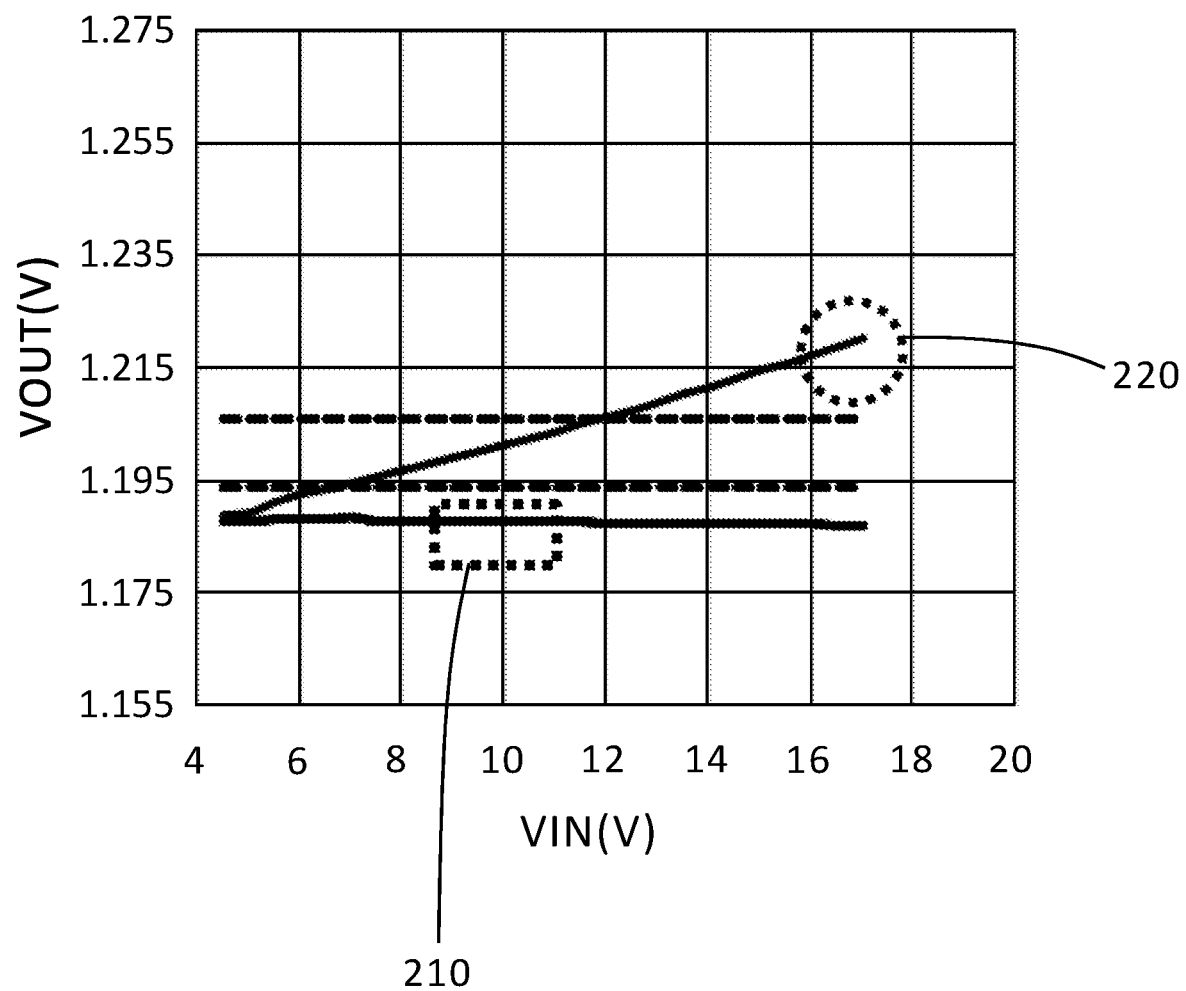
FIG. 2A is a graph illustrating line regulation for COT converters with and without control circuit according to an embodiment of the present invention.
Figure 2B:
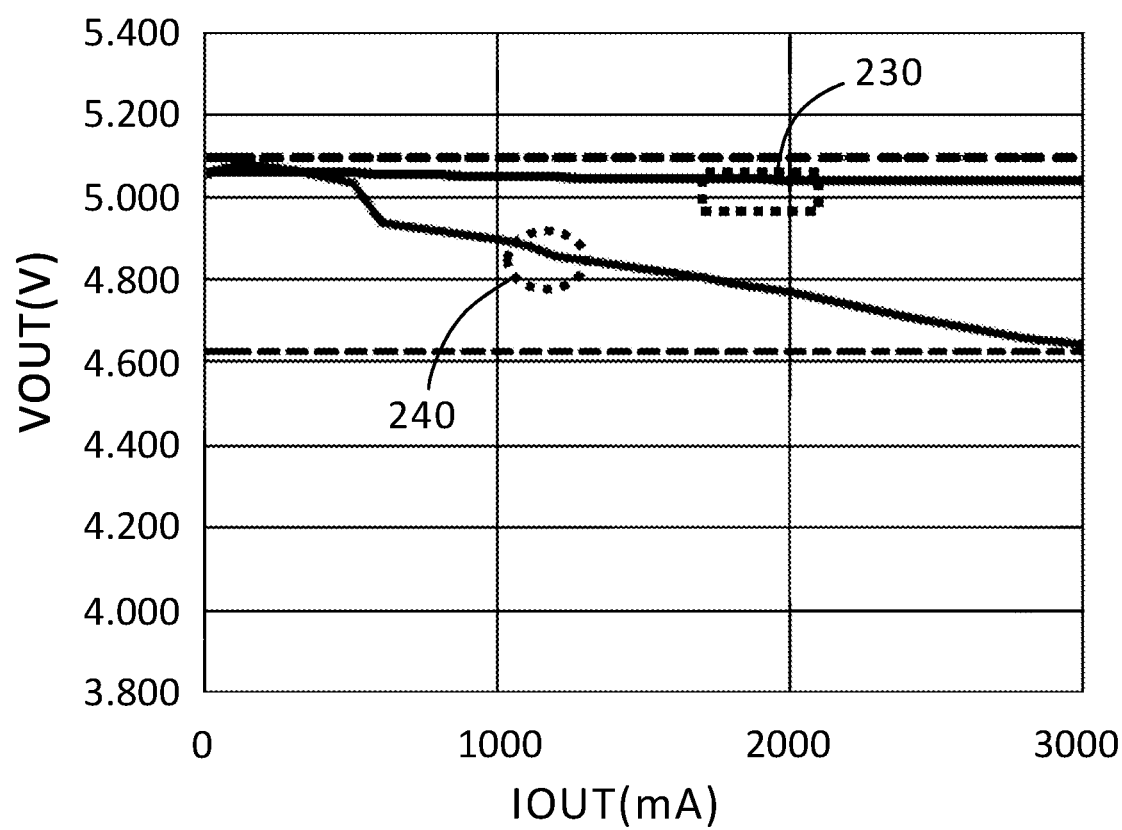
FIG. 2B is a graph illustrating load regulation for COT converters with and without control circuit according to an embodiment of the present invention.

Refer to FIG. 2A, which is a graph illustrating line regulation for COT converters with and without control circuit according to an embodiment of the present invention, wherein the target output voltage signal $V_{out}$ is set to be 1.2 V with an output current of 10 mA. Refer to FIG. 2B, which is a graph illustrating load regulation for COT converters with and without control circuit according to an embodiment of the present invention, wherein the target output voltage signal $V_{out}$ is set to be 5 V with an input voltage signal of 12 V. It is noted that FIGS. 2A and 2B show simulation results from comparing a COT converter with control circuit (e.g., COT converter 100 of FIG. 1) and a COT converter without control circuit. The COT converter without control circuit used in the simulation, for example, is a COT converter including the COT converter circuit of FIG. 1 (as indicated by dashed line) but the positive terminal of the comparator 105 receives the reference voltage signal $V_{REF}$ (e.g., a constant voltage) directly without control circuit.

As shown in FIG. 2A, without the control circuit (e.g., 180 of FIG. 1), the output voltage (VOUT) (illustrated by 220) exceeds the range (e.g., +0.5% to −0.5%) (as indicated by dashed lines) with respect to the target output voltage when the input voltage (VIN) varies so that the line regulation is worse. With the control circuit (e.g., 180 of FIG. 1), the output voltage (VOUT) (illustrated by 210) is stable and the line regulation is improved.

As shown in FIG. 2B, without the control circuit (180 FIG. 1) the output voltage (VOUT) (illustrated by 240) decreases in the range (e.g., +4% to −5.5%) (as indicated by dashed lines) with respect to the target output voltage when the output current (IOUT) varies so that the load regulation is worse. With the control circuit (e.g., 180 of FIG. 1), the output voltage (VOUT) (illustrated by 230) is stable and the load regulation is improved.

Figure 3A:
FIG. 3A is a graph illustrating transient response for the COT converter without control circuit according to an embodiment of the present invention.
Figure 3B:
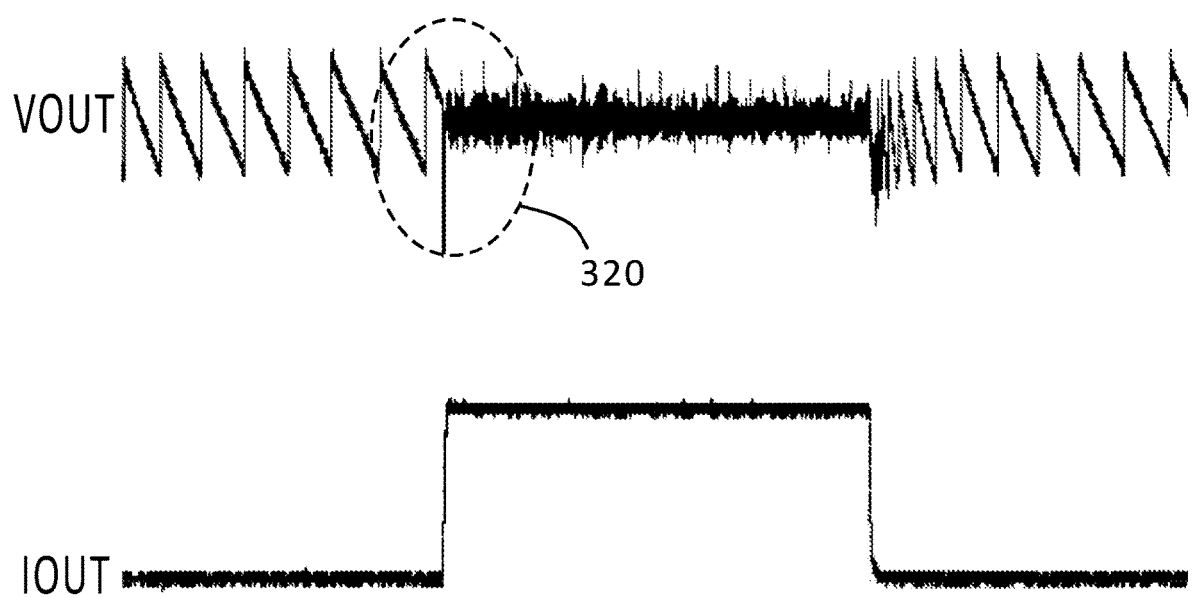
FIG. 3B is a graph illustrating transient response for the COT converter with error amplifier controller according to an embodiment of the present invention.

Refer to FIG. 3A, which is a graph illustrating transient response for the COT converter without control circuit according to an embodiment of the present invention and refer to FIG. 3B, which is a graph illustrating transient response for the COT converter with error amplifier controller according to an embodiment of the present invention.

As shown in FIG. 3B, the output voltage in the transient response for the COT converter with the control circuit (e.g., 180 of FIG. 1) may have undershoot or down-spike waveform (320), as compared to the transient response (310) for the COT converter without the control circuit as shown in FIG. 3A.

Therefore, in order to improve the transient response with the addition of the control circuit (e.g., 180 of FIG. 1), embodiments of a control circuit for a COT converter according to the present invention are provided to generate a new reference voltage signal $V_{NREF}$ as follows.

Figure 4:
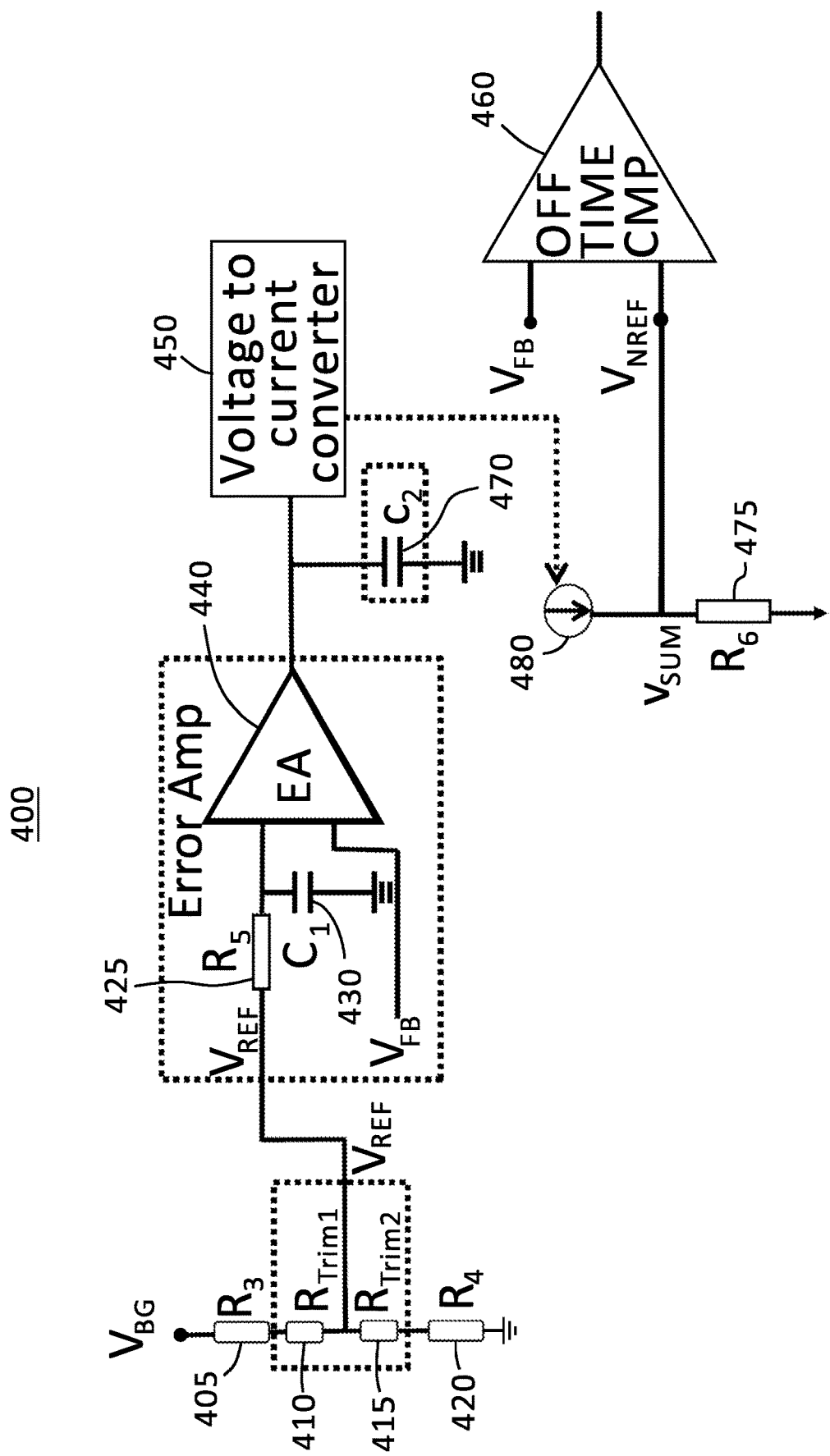
FIG. 4 is a schematic drawing illustrating a control circuit for a constant on-time (COT) converter according to an embodiment of the present invention.

Refer to FIG. 4, which is a schematic drawing illustrating a control circuit for a constant on-time (COT) converter (or referred to as a COT converter control circuit) according to an embodiment of the present invention.

As shown in FIG. 4, a COT converter control circuit 400 to generate a new reference voltage signal $V_{NREF}$ comprises an error amplifier 440 (or an error amplifier stage) and a voltage to current converter 450.

The error amplifier 440 is for receiving a reference voltage signal $V_{REF}$ and a feedback voltage signal $V_{FB}$ and outputting a compensated voltage signal.

For example, the feedback voltage signal $V_{FB}$ can be provided by a voltage divider. An input voltage signal $V_{BG}$ is provided to a first end of a third resistor ($R_3$) 405. A second end of the third resistor 405 is electrically connected to a first end of a first resistor ($R_{TRIM1}$) 410. A second end of the first resistor 410 is electrically connected to a first end of a second resistor ($R_{TRIM2}$) 415. A second end of the second resistor 415 is electrically connected to a first end of a fourth resistor 420. The node created by the connection between the first resistor 410 and the second resistor 415 is electrically connected to a first end of a fifth resistor ($R_5$) 425 to provide the reference voltage signal $V_{REF}$.

In the error amplifier stage (as indicated by dashed line), a second end of the fifth resistor 425 is connected to a first input of the error amplifier 440. A first capacitor ($C_1$) 430 is connected between the first input of the error amplifier 440 and reference ground. The feedback voltage signal $V_{FB}$ is provided to a second input to the error amplifier 440. The feedback voltage signal $V_{FB}$ is provided internally from the COT converter circuit (e.g., as indicated by dashed line in FIG. 1).

The output of the error amplifier 440 is electrically connected to the input of the voltage to current converter 450 (e.g., an active voltage to current converter based on an operational amplifier). A second capacitor (C2) 470 is connected between the output of the error amplifier 440 and ground. The output of the voltage to current converter 450 provides a current source 480 to create the new reference voltage signal $V_{NREF}$. The new reference voltage signal $V_{NREF}$ is provided to a second input of an off time comparator 460. A sixth resistor ($R_6$) 475 is connected to the second input of the off time comparator 460. The feedback voltage signal $V_{FB}$ is provided to the first input of the off time comparator 460.

In operation, the error amplifier 440, the fifth resistor 425, and the first capacitor 430 (or the error amplifier stage) cooperate to provide DC calibration. The second capacitor 470 provides a compensation function.

Referring to FIG. 4 and FIG. 1, in an embodiment of the present invention, the output of the COT converter control circuit 400 of FIG. 4 is the new reference voltage signal $V_{NREF}$ that is input into the positive input of the comparator 105 of FIG. 1.

In an embodiment of the present invention, the off time comparator 460 of FIG. 4 serves as an implementation of the comparator 105 of FIG. 1.

Figure 5:
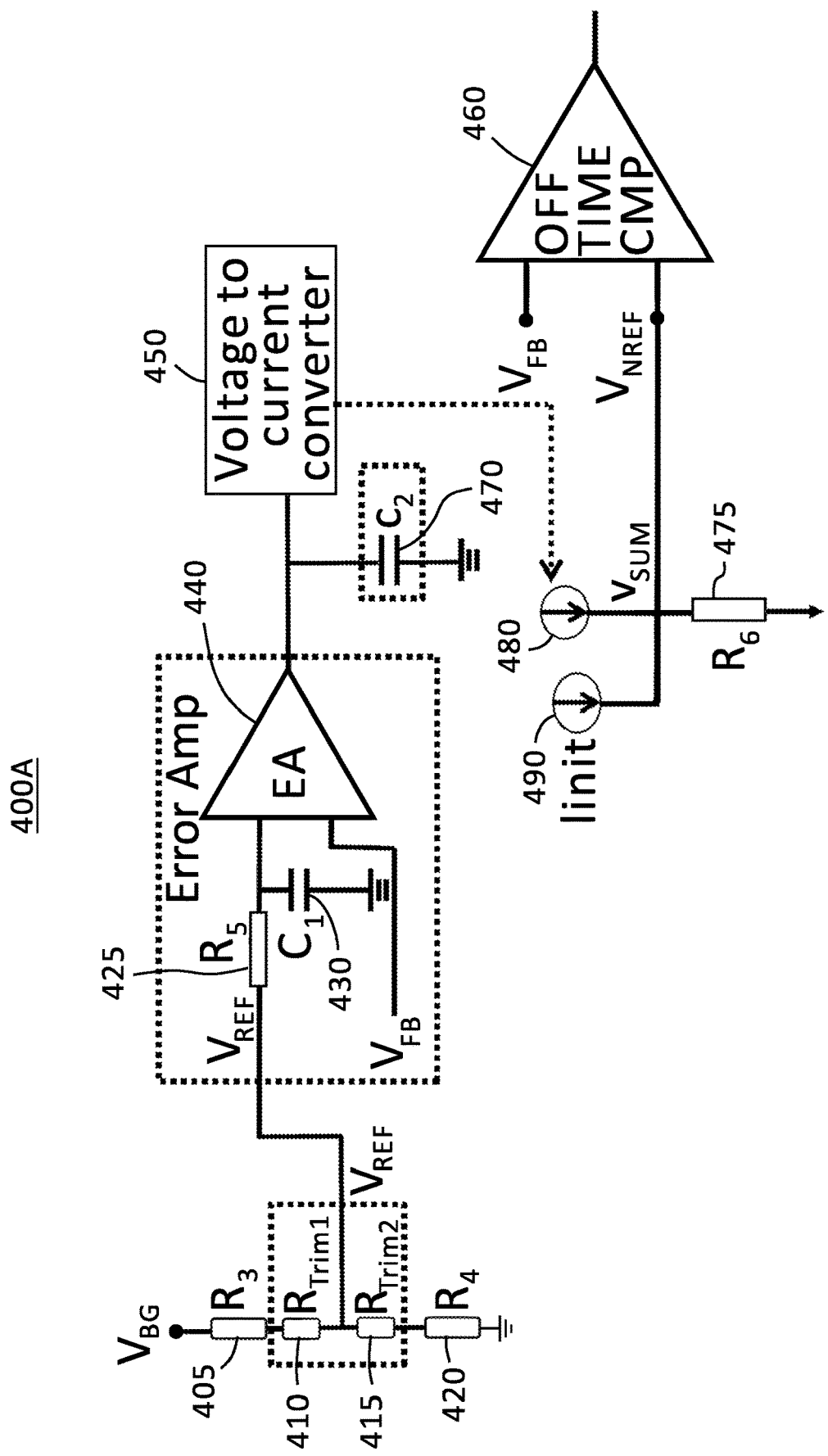
FIG. 5 is a schematic drawing illustrating a control circuit for a constant on-time (COT) converter according to an embodiment of the present invention.

Refer to FIG. 5, which is a schematic drawing illustrating a control circuit for a constant on-time (COT) converter according to an embodiment of the present invention.

In the embodiment of the present invention illustrated in FIG. 5, a COT converter control circuit 400A, as compared with that of FIG. 4, further comprises an additional current source 490 that provides an initial current Iinit to the second input of the off time comparator 460 to provide the new reference voltage signal $V_{NREF}$. The new reference voltage signal $V_{NREF}$ is determined based on the current source 480 and the current source 490. The current source 490, in some examples, can be implemented by one or more current sources.

For example, the formula for the initial current is Iinit*$R_6$=variable*$V_{REF}$, wherein $R_6$ indicates the resistance of the sixth resistor 475 of FIG. 5 and $V_{REF}$ is the reference voltage signal provided to the first end of the fifth resistor 425. In other words, the value of the initial current signal can be determined by the value of the reference voltage signal multiplied by a variable and divided by the value of the sum resistor. The variable is, for example, a weighting value selected depending on circuit requirements. The larger the value of the variable results in faster switching or better transient response. For example, the variable can be selected to be 0.9 to obtain a 90% of $V_{REF}$ result. In some examples, the variable can be a positive value less than 1, e.g., 0.5, 0.6, 0.7, 0.8, 0.91, 0.95, to obtain some percentage of $V_{REF}$ result. During the operation of the COT converter control circuit, the initial current Iinit is always on and never off.

In the embodiment of FIG. 5 with the initial current Iinit provided by the current source 490, the loading of the error amplifier 440 for providing the current source 480 through the voltage to current converter 450 is reduced or is shared by the current source 490, as compared to the embodiment of FIG. 4. Thus, the transient response for a COT converter using the COT converter control circuit 400A can be improved.

Figure 6:
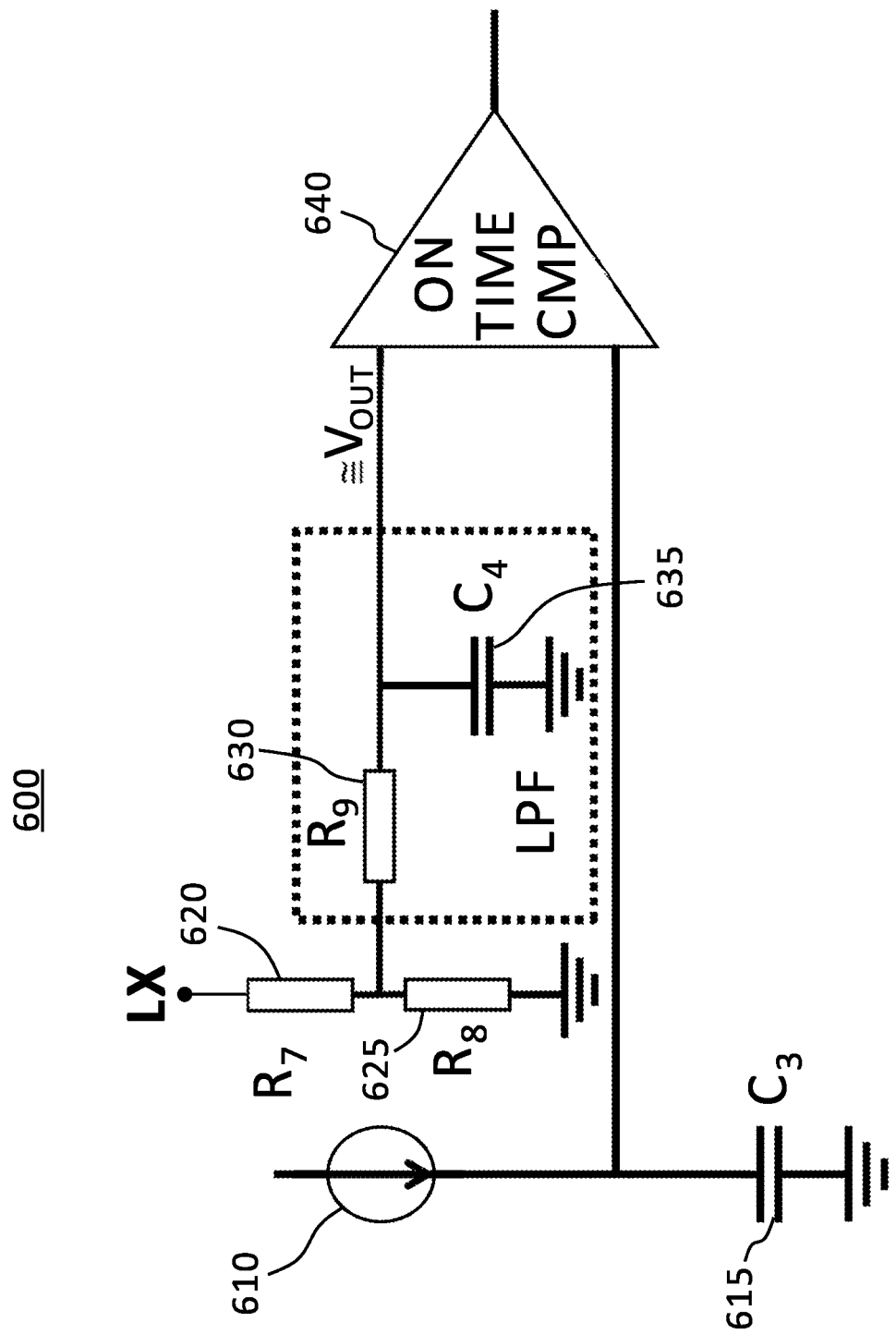
FIG. 6 is a schematic drawing illustrating an ON time control circuit for a constant on-time (COT) converter according to an embodiment of the present invention.

Refer to FIG. 6, which is a schematic drawing illustrating an ON time control circuit 600 for a constant on-time (COT) converter according to an embodiment of the present invention. Referring to FIG. 6 and FIG. 1, in an embodiment of the present invention, the ON time control circuit 600 of FIG. 6 serves as an implementation of the ON time control circuit 190 of FIG. 1 and the output of the ON time control circuit 600 of FIG. 6 is coupled to the input R of the monostable multivibrator 110 of FIG. 1.

The ON time control circuit 600 comprises a current source 610 that provides a signal to a second input of an ON time comparator 640 wherein the current of the current source 610 is implemented to be proportional to an input voltage $V_{IN}$ of the constant on-time (COT) converter 100. As a result, the more the signal increases the more the ON time decreases.

A first end of a seventh resistor ($R_7$) 620 is connected to the output stage such as a node LX connected to the conductor 150. A second end of a seventh resistor ($R_7$) 620 is connected to a first end of an eighth resistor ($R_8$) 625. A second end of the eighth resistor 625 is connected to reference ground. A first end of a ninth resistor ($R_9$) 630 is connected to the node created between the seventh resistor 620 and the eighth resistor 625. A second end of the ninth resistor 630 is connected to a first input of the ON time comparator 640.

A third capacitor ($C_3$) 615 is connected between the current source 610 and reference ground. A fourth capacitor ($C_4$) 635 is connected between second end of the ninth resistor 630 and reference ground. The ninth resistor 630 and the fourth capacitor 635 cooperate to form a low pass filter (LPF). The signal output by the low pass filter to the first input of the ON time comparator 640 is approximately equal to $V_{out}$.

Figure 7A:
FIG. 7A is a waveform diagram of transient response with a larger ON time according to an embodiment of the present invention.
Figure 7B:
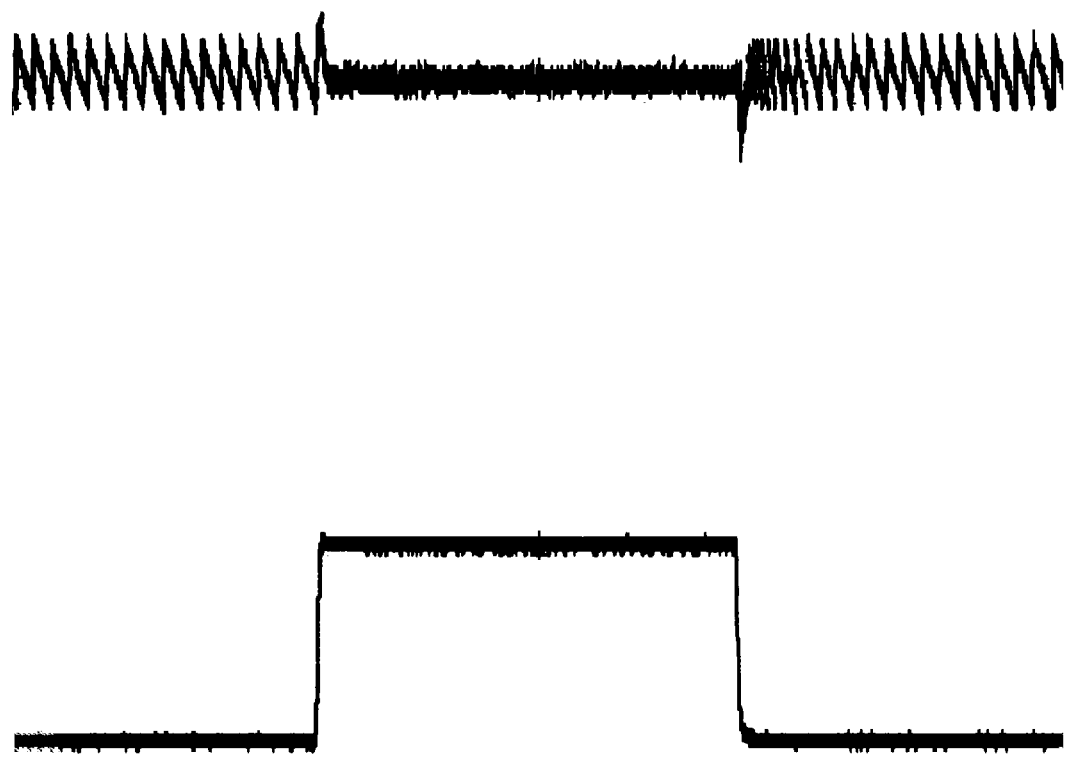
FIG. 7B is a waveform diagram of transient response with a smaller ON time according to an embodiment of the present invention.

Refer to FIG. 7A, which is a waveform diagram of transient response with a larger ON time according to an embodiment of the present invention and refer to FIG. 7B is a waveform diagram of transient response with a smaller ON time according to an embodiment of the present invention.

As shown in FIG. 7A, the transient response of a circuit with a larger ON time results in a down spike (or undershoot) while transitioning. As shown in FIG. 7B, the transient response of a circuit with a smaller ON time does not exhibit a down spike while transitioning.

In the above embodiments, it is noted that the embodiment of the constant on-time (COT) converter 100 is for sake of illustration only. Certainly, the COT converter according to the invention can be realized according to the COT converter circuit of FIG. 1 (as indicated by dashed line) or other COT converter circuit (e.g., buck converter), with a COT converter control circuit according to FIG. 5.

While the present disclosure has been described by means of specific embodiments, numerous modifications and variations could be made thereto by those skilled in the art without departing from the scope and spirit of the present disclosure set forth in the claims.

What is claimed is:

1. A constant on time converter control circuit comprising:
   an error amplifier for receiving a reference voltage signal and a feedback voltage signal and outputting a compensated voltage signal;
   a voltage to current converter for receiving the compensated voltage signal and outputting a converted current signal;
   an initial current source for providing an initial current signal, the initial current signal and the converted current signal forming a new reference voltage signal; and
   a sum resistor electrically connected to the initial current source;
   wherein the initial current source provides the initial current signal whose value is according to a value of the reference voltage signal multiplied by a variable and divided by a value of the sum resistor, wherein the variable is a positive value less than 1.

2. The constant on time converter control circuit according to claim 1, further comprising:
   a comparator for receiving the new reference voltage signal and the feedback voltage signal and outputting a control signal.

3. The constant on time converter control circuit according to claim 2, wherein the control signal affects turning on and turning off of electronic switches to produce an output voltage signal of a constant on time converter.

4. The constant on time converter control circuit according to claim 2, wherein the comparator comprises an OFF time comparator.

5. The constant on time converter control circuit according to claim 1, further comprising:
   a low pass filter electrically connected to an input of the error amplifier.

6. The constant on time converter control circuit according to claim 5, wherein the low pass filter comprising a filter resistor and a filter capacitor.

7. The constant on time converter control circuit according to claim 1, further comprising:
   a compensation capacitor electrically connected to an output of the error amplifier.

8. The constant on time converter controller according to claim 1, wherein the variable is greater than 0.5.

9. A constant on time converter control circuit comprising:
   an error amplifier for receiving a reference voltage signal and a feedback voltage signal and outputting a compensated voltage signal;

a voltage to current converter for receiving the compensated voltage signal and outputting a converted current signal;

an initial current source for providing an initial current signal, the initial current signal and the converted current signal forming a new reference voltage signal;

a constant on time OFF time comparator for receiving the new reference voltage signal and the feedback voltage signal and outputting a control signal;

wherein the control signal affects turning on and turning off of electronic switches to produce an output voltage signal of a constant on time converter;

a sum resistor electrically connected to the initial current source;

a low pass filter electrically connected to an input of the error amplifier; and a compensation capacitor electrically connected to an output of the error amplifier;

wherein the initial current source provides the initial current signal whose value is according to a value of the reference voltage signal multiplied by a variable and divided by a value of the sum resistor, wherein the variable is a positive value less than 1.

10. The constant on time converter control circuit according to claim 9, wherein the variable is greater than 0.5.

11. A constant on time converter comprising:

a constant on time converter circuit including a comparator for receiving a new reference voltage signal and a feedback voltage signal and outputting a control signal, wherein the feedback voltage signal is internally from the constant on time converter circuit; and a constant on time converter control circuit including:

an error amplifier for receiving a reference voltage signal and the feedback voltage signal and outputting a compensated voltage signal;

a voltage to current converter for receiving the compensated voltage signal and outputting a converted current signal;

an initial current source for providing an initial current signal, the initial current signal and the converted current signal forming a new reference voltage signal; and a sum resistor electrically connected to the initial current source;

wherein the initial current source provides the initial current signal whose value is according to a value of the reference voltage signal multiplied by a variable and divided by a value of the sum resistor, wherein the variable is a positive value less than 1.

12. The constant on time converter according to claim 11, wherein the control signal affects turning on and turning off of electronic switches to produce an output voltage signal of the constant on time converter.

13. The constant on time converter according to claim 11, wherein the comparator comprises an OFF time comparator.

14. The constant on time converter according to claim 11, wherein the constant on time converter control circuit further comprises:

a low pass filter electrically connected to an input of the error amplifier.

15. The constant on time converter according to claim 11, wherein the constant on time converter control circuit further comprises:

a compensation capacitor electrically connected to an output of the error amplifier.

* * * * *